Jan. 15, 1957  A. E. BREED  2,777,268
CROP HARVESTING ROTOR HAVING PIVOTED CROP ENGAGING MEMBERS
Filed Oct. 6, 1954

FIG. I

INVENTOR.
A. E. BREED

United States Patent Office 2,777,268
Patented Jan. 15, 1957

2,777,268

CROP HARVESTING ROTOR HAVING PIVOTED CROP ENGAGING MEMBERS

Arie E. Breed, Ottumwa, Iowa, assignor to Deere Manufacturing Co., Dubuque, Iowa, a corporation of Iowa Application October 6, 1954, Serial No. 460,528

3 Claims. (Cl. 55—118)

This invention relates to a rotor construction for a crop-harvesting machine of the type in which a mobile frame advances over the field and carries the rotor for the handling of field-borne crops, whether such crops are growing or are lying on the field after having been previously severed.

A machine of the general character referred to above is useful primarily as a forage machine and normally the rotor construction is such as to comprise a central shaft having thereon a plurality of flail-like crop-engaging members operative to accomplish both picking up and reduction of the crops, the rotor also serving as means for transferring the picked up and reduced crops to a conveyor of one form or another for ultimate transfer to a wagon or other suitable receptacle towed by the machine. In this general respect, the machine differs from sickle-type forage harvesters such as that forming the subject matter of the U. S. patent to Tuft 2,507,742.

In a forage machine of the rotor type, as referred to above, various problems are presented that do not occur in machines of the sickle bar type, for example. Since the crop-engaging members operate relatively close to the ground, they are apt to encounter foreign objects such as stones and the like and for this reason the members are mounted on the rotor on individual pivots so that they can yield in a counter-rotational direction. Another problem that presents itself is one of the members striking neighboring members when the speed of the rotor is reduced. That is to say, when the machine is shut down, the speed of the rotor shaft approaches zero but the inertia of the crop-engaging members tends to carry them in the direction of rotation and they are apt to strike members preceding them. In cases in which the success of the rotor depends upon the preservation of sharp cutting edges, the interference among the members, caused by their striking each other, causes dulling of the edges. Moreover, the noise occurring in the same circumstances is annoying.

According to the present invention, stop means is provided for each crop-engaging member, the stop means being of the one-way type which is effective to limit pivoting of the member relative to the shaft past its normal operating position but permitting the counter-rotational pivoting of the member relative to the shaft in the event that rotation of the member with the shaft is impeded. In other words, considering the rotor as having a normal direction of rotation, which may be said to be forwardly, the one-way stop means on each mounting for each crop-engaging member prevents relative forward pivoting of the member but permits relative rearward pivoting of the member. It is an object of the invention to accomplish the foregoing general object by a simple and economical construction and one that will permit the interchangeability of the members or the replacement thereof by identical or similar members.

The foregoing and other important objects and desirable features inherent in and encompassed by the invention will become apparent as a preferred embodiment of the invention is disclosed in detail in the following specification and accompanying sheet of drawings, the several figures of which will be described immediately below.

Fig. 1 is a perspective of a representative type of machine.

Figure 2:
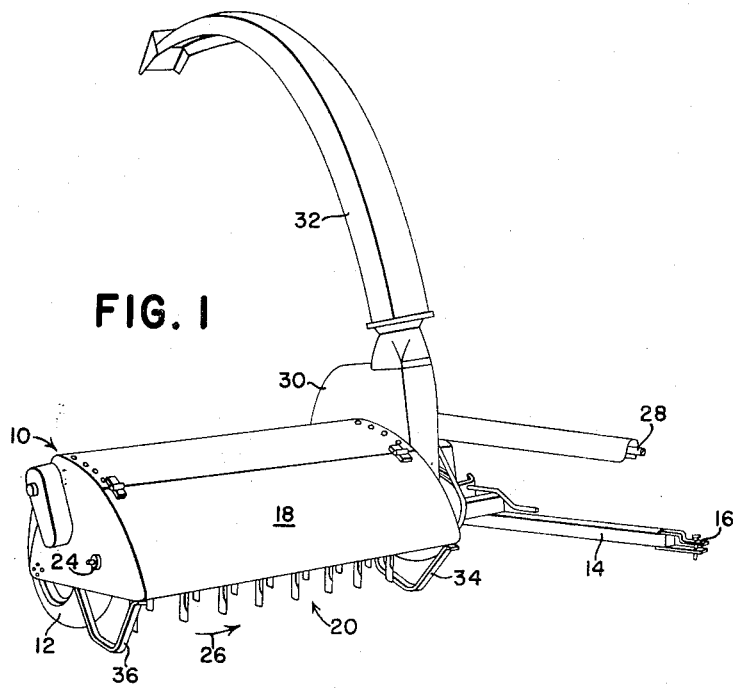
Fig. 2 is an enlarged sectional view of the rotor taken in a plane perpendicular to the rotor axis.

The machine selected for the purposes of general illustration (Fig. 1) is a mobile machine having a main frame 10 carried on ground-engaging wheels, only the right-hand one of which is visible at 12, and including a forwardly extending draft tongue 14 having a clevis 16 for connection to the drawbar of a tractor in any well known manner. The expressions "right-hand" and "left-hand" are used with reference to the position of an observer standing behind the machine and looking forwardly.

The main frame 10 includes a rotor housing 18 within which is carried a rotor 20. This rotor includes a central power-driven rotor shaft 22 journaled in the housing 18 with its rotational axis transverse to the line of advance of the machine. The general location of the axis of the rotor shaft 22 may be seen in Fig. 1 by the location of a bearing 24 in which the right-hand end of the shaft is journaled, it being understood that a similar bearing (not visible) carries the left-hand end of the shaft. Power for imparting rotation to the rotor 20 in the direction of the arrow 26 is derived conventionally from the power take-off shaft of the tractor (not shown) to which the machine is connected, the machine having any suitable type of propeller shaft, as at 28, for the power-transmitting purpose.

As the machine is drawn over the field, the rotor collects crops from the field, whether these crops are still growing or have been previously harvested and left lying on the field in swaths or windrows. As the rotor continues in its direction of rotation (arrow 26), it carries the crop rearwardly to a conveyor (not shown) contained within a rear part of the housing 18, which conveyor serves to move the reduced crops laterally to the left and into a blower 30, which housing has a rearwardly arched discharge spout 32 by means of which the reduced crops are conveyed to a wagon (not shown) towed behind the machine. The general characteristics of the mechanism within the housing 30 and the relationship thereof to a discharge spout such as that shown at 32 are set forth in the above-identified Tuft patent and need no further elaboration here.

The housing 18 is equipped at its right- and left-hand ends respectively with U-shaped guard elements 34 and 36 which serve to support the machine when disconnected from its tractor and which, in the use of the machine, function as crop dividers as well as guards for preventing endwise entrance of objects into the rotor.

The machine illustrated lends itself very readily to the harvesting of hay and like material and is commonly known as a hay chopper. However, the machine will satisfactorily handle field-borne stalks and trash. In any event, the rotor construction, particularly the type shown here, comprises the central shaft 22, already described, which shaft is provided with a plurality of pivot elements in the form of apertured ears 38 which project radially outwardly from the shaft and which are spaced both circumferentially and axially of the shaft. Each ear or pivot element has a pivot pin 40 which provides a pivot axis parallel to but spaced radially outwardly from the rotational axis of the shaft 22. In the type of rotor illustrated, the ears are arranged in diametrical pairs so that the horizontal ears (as seen in Fig. 2) are in diametrical alinement but are spaced axially from the diametrically alined vertical ears. Stated otherwise, the horizontal ears are in one radial plane and the vertical ears are in an axially spaced radial plane, and so on along the shaft 22. The pivot elements or ears respectively carry a plurality of hammer or flail-like crop-engaging members 42, the members 42 being equal in number to the ears or elements 38.

Each member 42 has an inner end 44 and an outer end 46, the expressions "inner" and "outer" being used with reference to their proximity to the shaft 22. Each member further has a sharpened leading edge 48 and a trailing edge 50, the expressions "leading" and "trailing" being used with reference to the direction of rotation of the rotor as indicated by the arrow 26. Since the members 42 are pivotally mounted respectively on the ears 38 and on the individual pivot axes established by the pivot pins 40, the members will assume operating positions standing out radially from the shaft 22 as the shaft rotates. The two lower left-hand members 42 are shown in their operating positions. The two upper right-hand members are shown in the positions they will occupy when the rotor is at rest.

Figure 3:
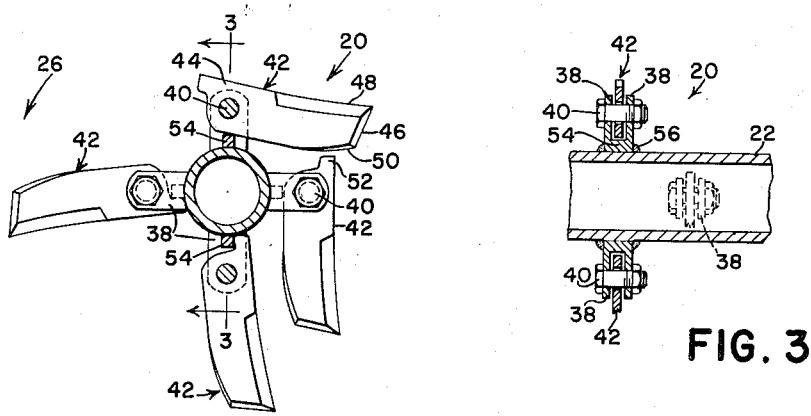
Fig. 3 is a fragmentary sectional view taken substantially on the line 3—3 of Fig. 2.

In rotor constructions of the types previously known the hammer members were mounted for free swinging so that, when the speed of the shaft 22 was decreased, the inertia of the members would continue to carry them past their operating positions. Since the speed of some of the members would decrease sooner than others, there was considerable striking of the sharpened leading edges of the members on the trailing edges of preceding members, resulting not only in annoying noise but in dulling of the edges. According to the present invention, these disadvantages are eliminated by the provision of one-way stop means. In its broadest form, the stop means includes an integral portion 52 on the inner end 44 of each member 42. The portion 52 is offset or projects radially inwardly past the respective pivot pin 40 and is engageable not only with the exterior of the shaft 22 but with a stop lug 54 rigid on the shaft between the associated pair of ears 38 and projecting radially outwardly from the shaft in the path of movement of the associated stop 52 on the respective member 42. In a preferred construction, the stop lug 54 will be integral with the respective ears 38 and the assembly thus established will be rigidly secured to the shaft 22 as by welding at 56 (Fig. 3).

The cooperative stop portions 52 and 54 are so arranged that, when engaged, the associated member 42 is in its operating position; that is, the member 42 is standing out radially from the shaft 22. When the stops are engaged, the member 42 cannot move relative to the shaft 22 in a forward direction past the operating position thereof. Stated otherwise, the stop means prevents the associated member 42 from pivoting past its operating position in the direction of rotation of the rotor (arrow 26). However, because of the one-way characteristic of the stop, counter-rotational pivoting of the members 42 is permitted. Hence, if rotation of the members 42 with the shaft 22 is for any reason impeded, as would occur if one of the members struck a stone or other heavy obstacle in the field, that member could yield rearwardly about its pivot pin 40. The stop lugs 54 serve another function in engaging the trailing edge portion 50 of the associated member so as to prevent counter-rotational pivoting beyond the limit shown by the position of the upper and right-hand members 42 in Fig. 2. In other words, as the members 42 yield rearwardly about their respective pivot pins, they cannot strike the next trailing member. Consequently, undesirable noise is eliminated and dulling of the edges occurring because of striking of trailing and leading edges of neighboring members is prevented.

In normal operation, as stated above, the members 42 will stand out radially from the shaft 22 as the rotor rotates and attains operating speed. On occasions when the machine is shut down, for example, the speed of the rotor shaft 22 will, of course, fall off to zero. As the inertia of the members 42 continues to rotate the rotor by the flywheel action, the stop portions 52 will abut or engage the respective stop lugs 54 and proximate portions of the exterior of the shaft 22, thus limiting rotational pivoting of the members 42 past their radially standing out operating positions. As the rotor ultimately comes to rest, the members will assume various positions, depending upon the angles of the diameters on which the pivot pins 40 are located. As shown in Fig. 2, the rotor is at rest with certain of the ears horizontal and other ears vertical. The lower left-hand members 42 will consequently have their stop portions 52 engageable with the stop lugs 54 and associated portions of the shaft and will be at rest in their operating positions. The other members, however, will assume positions as indicated, the right-hand member 42 depending from its pivot 40 and the upper member 42 lying backwardly with its trailing edge portion 50 engaging its associated stop lug 54.

Other features and advantages, not specifically enumerated herein, will undoubtedly occur to those versed in the art, as will various modifications and alterations in the preferred embodiment disclosed, all of which may be achieved without departing from the spirit and scope of the invention.

What is claimed is:

1. In a mobile crop-reducing machine adapted to advance over a field of crops: rotor means for reducing crops on the field as the machine advances, comprising a power-driven rotor shaft journaled on the machine with its rotational axis transverse to the line of advance and rotatable in one direction, said shaft having rigid thereon and projecting radially outwardly from the peripheral surface thereof a plurality of ears spaced both circumferentially and axially theerof, each ear having an aperture therein on an axis parallel to the shaft axis and closely radially outwardly of the peripheral surface of the shaft and each ear carrying a pivot pin; a plurality of crop-engaging members, one for each ear and each having an inner end and an outer end, said members being connected respectively to the pivot pins for rotation with the shaft to occupy operating positions in which said members respectively stand out radially from the shaft so that the outer ends thereof successively engage field-borne crops when the shaft is rotated in the aforesaid direction; and a plurality of one-way stop means respectively cooperative between the shaft and the inner ends of the members for preventing pivoting of the members relative to the shaft substantially past their operating positions and in the direction of rotation when the speed of the shaft increases, said stop means enabling counter-rotational pivoting of said members relative to the shaft in the event that rotation of the members with the shaft is impeded, each stop means including a shaft-proximate portion of the inner end of a member and a cooperative shaft-carried portion radially inwardly of the respective pivot axis.

2. The invention defined in claim 1, in which: each stop means includes an integral stop portion on the inner end of the respective member positioned ahead of the respective pivot axis as respects the direction of rotation and projecting radially inwardly past said respective pivot axis to engage the shaft when said respective member is substantially in its operating position.

3. The invention defined in claim 2, in which: each stop means additionally includes a radially outwardly projecting lug rigid on the shaft adjacent to the respective pivot element and engageable behind the stop portion on the respective member when said member is substantially in its operating position.

References Cited in the file of this patent

UNITED STATES PATENTS

| | | |
|---|---|---|
| 1,893,871 | Romera | Jan. 10, 1933 |
| 2,529,797 | Cauble | Nov. 14, 1950 |
| 2,661,585 | Hansen | Dec. 8, 1953 |